(12) United States Patent
Jiang et al.

(10) Patent No.: US 12,555,182 B2
(45) Date of Patent: Feb. 17, 2026

(54) PRE-PROCESSING SYSTEM AND METHOD THEREOF

(71) Applicant: MediaTek Singapore Pte. Ltd., Singapore (SG)

(72) Inventors: Zhi-Ming Jiang, Beijing (CN); Peng-Hui Liu, Beijing (CN); Qian Dong, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 83 days.

(21) Appl. No.: 18/651,765

(22) Filed: May 1, 2024

(65) Prior Publication Data

US 2025/0328985 A1    Oct. 23, 2025

(30) Foreign Application Priority Data

Apr. 22, 2024  (CN) .......................... 202410486924.0

(51) Int. Cl.
*G06T 1/60* (2006.01)
*G06F 12/0875* (2016.01)
*G06T 1/20* (2006.01)

(52) U.S. Cl.
CPC ............ *G06T 1/60* (2013.01); *G06F 12/0875* (2013.01); *G06T 1/20* (2013.01); *G06F 2212/455* (2013.01)

(58) Field of Classification Search
CPC ......... G06T 1/60; G06T 1/20; G06F 12/0875; G06F 2212/455
See application file for complete search history.

(56) References Cited

U.S. PATENT DOCUMENTS

| | | | |
|---|---|---|---|
| 9,317,175 B1* | 4/2016 | Lockhart | G06F 3/04847 |
| 2015/0347107 A1* | 12/2015 | Munshi | G06F 8/44 |
| | | | 717/147 |
| 2020/0058263 A1* | 2/2020 | Mckeever | G06T 15/506 |

* cited by examiner

*Primary Examiner* — Said Broome
*Assistant Examiner* — Andrew Shin
(74) *Attorney, Agent, or Firm* — McClure, Qualey & Rodack, LLP

(57) ABSTRACT

A pre-processing system for pre-compiling a shader, includes the following elements. A first persistent cache, disposed in a render engine of surface-flinger. A second persistent cache, disposed in a HWUI (Hardware Accelerated Rendering Engine for UI). A generating module, used to generate a text file, a binary file and a describer associated with the shader, and the shader is used to render a plurality of pages for an application program (APP). An installing module, used to store the text file and the binary file into a scan file path of the first persistent cache and/or the second persistent cache based on the describer.

20 Claims, 5 Drawing Sheets

PRE-PROCESSING SYSTEM AND METHOD THEREOF

This application claims the benefit of P.R.C. application Serial No. 202410486924.0, filed Apr. 22, 2024, the disclosure of which is incorporated by reference herein in its entirety.

TECHNICAL FIELD

The present disclosure relates to a data processing mechanism, and particularly relates to a pre-processing system and a pre-processing method for a shader operating in a platform of a mobile device.

BACKGROUND

With the enhancement of computational capability of a mobile device with an Android platform, refresh rate of a mainstream screen for the mobile device is greatly increased. Such as, the refresh rate may increase to 120 Hz or 144 Hz. Given such a high refresh rate (e.g., 120 Hz), it needs to complete processing one frame in a quite short period (e.g., 8.3 ms).

In a graphical processing for an application program (APP) on the Android platform, a graphics processing unit (GPU) is utilized to render pages, animation, images, or schemes of the APP. A rendering time is required for each frame of the pages, animation, images, or schemes. Furthermore, in the current graphics rendering process, shaders need to be compiled. This means that during the rendering of each frame, GPU driver needs to compile the shader code into executable instructions to present the desired visual effects on the screen. Hence, shader compilation is a time-consuming process.

However, under high refresh rates, each frame must be completed within a short period, which will greatly reduce the rendering time for each frame. Therefore, the shader compilation will severely block the rendering process. In case the rendering process is blocked by the shader compilation, drops or lags of the frames will occur.

In view of the above issues, it is desirable to have an improved compiling mechanism for the shaders to reduce blocking in the rendering pipeline, such that smooth graphics rendering can be ensured, and performance issues caused by shader compilation may be avoided.

SUMMARY

According to one embodiment of the present disclosure, a pre-processing system for pre-compiling a shader is provided. The pre-processing system includes a first persistent cache, a second persistent cache, a generating module and an installing module. The first persistent cache is disposed in a render engine of surface-flinger. The second persistent cache is disposed in a HWUI (Hardware Accelerated Rendering Engine for UI). The generating module is for generating an output file which comprises a text file, a binary file and a describer associated with the shader, wherein the shader is used to render a plurality of pages for an APP (application program). The installing module is for storing the text file and the binary file into a scan file path of the first persistent cache or the second persistent cache based on the describer.

According to another embodiment of the present disclosure, a pre-processing method for pre-compiling a shader is provided. The pre-processing method includes the following steps. an output file is generated, which comprises a text file, a binary file and a describer associated with the shader, and the shader is used to render a plurality of pages for an APP (application program). The text file and the binary file are stored into a scan file path of a first persistent cache or the second persistent cache based on the describer. The first persistent cache is disposed in a render engine of surface-flinger.

Figure 1:
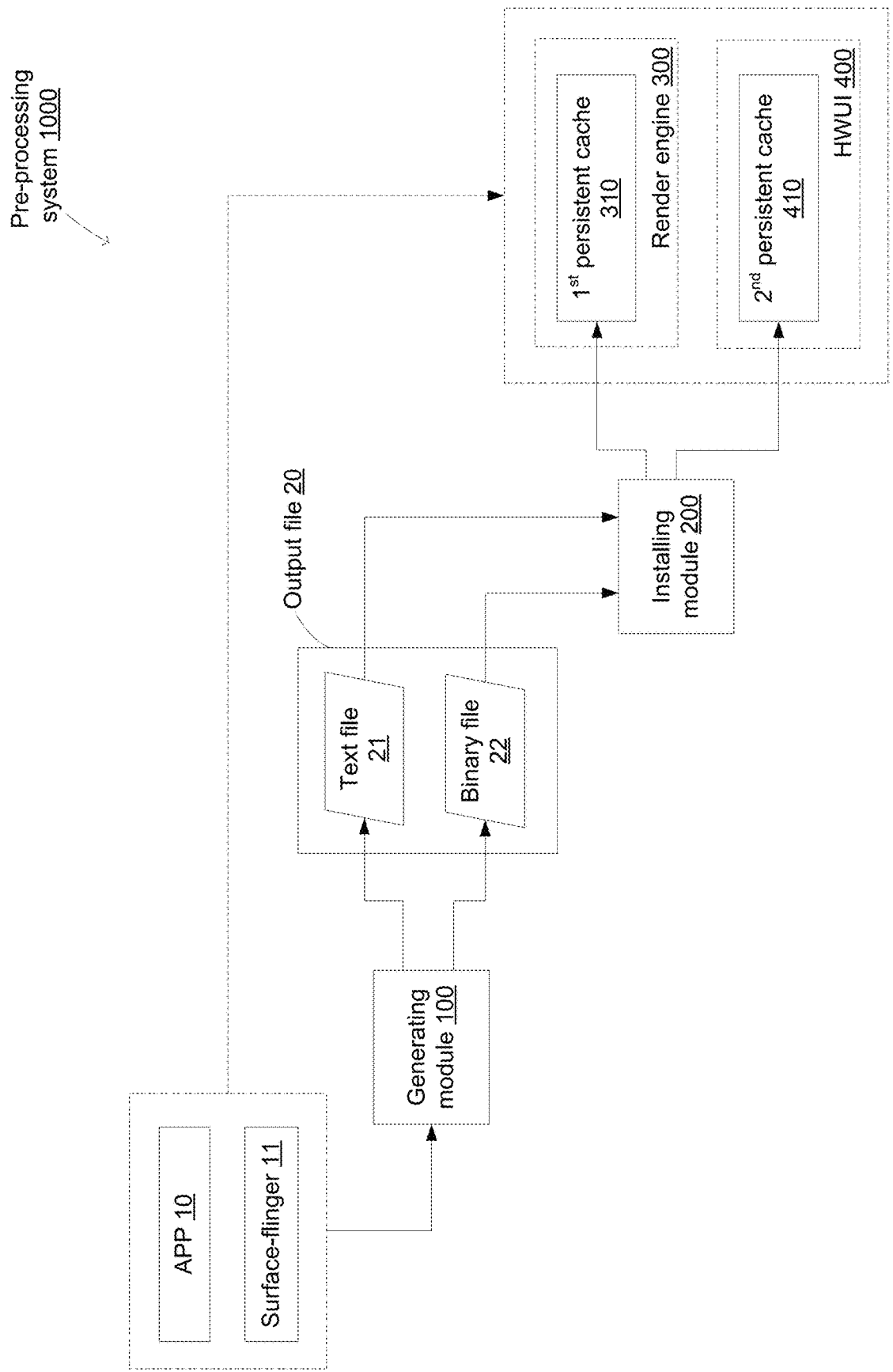
FIG. 1 is a block diagram of a pre-processing system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, which illustrates a block diagram of a pre-processing system 1000 according to an embodiment of the present disclosure. The pre-processing system 1000 is applied to an operating system of a local device. The local device is e.g., a smart phone, and the operating system is e.g., an Android system. The pre-processing system 1000 is used to process a shader in the operating system, and the shader is utilized for graphics rendering of pages, animation, images, or schemes of an APP 10 (i.e., application program) in the operating system. The pre-processing system 1000 may be a software program which is implemented by a set of instruction codes stored in a non-volatile storage medium of the local device. When loaded from the non-volatile storage medium, the pre-processing system 1000 may be executed by a processor (e.g., a CPU or a GPU) of the local device.

The pre-processing system 1000 includes a generating module 100, an installing module 200, a first persistent cache 310 and a second persistent cache 410. The generating module 100 and the installing module 200 may be sub-modules of the software program of the pre-processing system 1000. The first persistent cache 310 and the second persistent cache 410 may be memory caches in the local device.

More particularly, the pre-processing system 1000 is used to perform a pre-compilation for a shader, and the shader may be associated with an APP 10 in the operating system. The pre-compilation for the shader may be performed during an early development stage (e.g., when activated for the first time in the operating system) of the APP 10. The shader is used to perform graphics rendering for pages, schemes or contents of the APP 10 based on graphics rendering commands of a graphic interface (e.g., an Android graphic interface of "Canvas", "View", etc) in an upper layer.

Alternatively, the shader may be associated with a surface-flinger 11 to perform graphics rendering base on overlaying images with the GPU.

To operate the pre-compilation for the shader, firstly, the generating module 100 queries (e.g., polls) the interested pages, schemes or contents of the APP 10. Thereafter, the generating module 100 generates an output file 20 associated with the shader in a run-time manner, with the graphics rendering commands of the graphic interface in the upper layer. The output file 20 may have a format with several fields, including a first header, a second header and a payload, and such an output file 20 may be stored with a data exchange language (e.g., json, xml, etc.), which is a domain-specific language used in the Skia graphics library for describing the shader (i.e., the Skia graphics library is an open source 2D graphic library of a third party). The first header may contain a statistic information related to the shader. Furthermore, the second header may contain a key for the shader. The key may be a descriptive information for the attribute of the shader, which may serve as a feature value matched with the shader and used to lookup the shader. Moreover, the payload may contain a main information of the shader, which may take a text form or a binary form.

The payload of the output file 20 may include a text file 21 or a binary file 22. The text file 21 is portable for different types of local devices, on the other hand, the binary file 22 includes executable binary codes (e.g., shader binary codes) adapted to the hardware or software configuration of local device, hence the binary file 22 is directly executable by this type of local device. The installing module 200 obtains the text file 21 and/or the binary file 22 from the generating module 100, and installs the shader to the operating system of the local device based on the text file 21 and/or the binary file 22.

The text file 21 and/or the binary file 22 may be stored in the first persistent cache 310 and/or the second persistent cache 410 in a static manner. The first persistent cache 310 is a persistent cache associated with a render engine 300 of the Surface-flinger of the local device, and the second persistent cache 410 is a persistent cache associated with a HWUI 400 (i.e., Hardware Accelerated Rendering Engine for UI) of the local device. The data of the text file 21 and/or the binary file 22 in the first persistent cache 310 and/or the second persistent cache 410 can be retained when the local device is shut down. Such as, when the shader is associated with the APP 10, the text file 21 and/or the binary file 22 for the shader may be stored in the second persistent cache 410 in the HWUI 400. Alternatively, when the shader is associated with the surface-flinger 11, the text file 21 and/or the binary file 22 for the shader may be stored in the first persistent cache 310 in the render engine 300.

Figure 2:
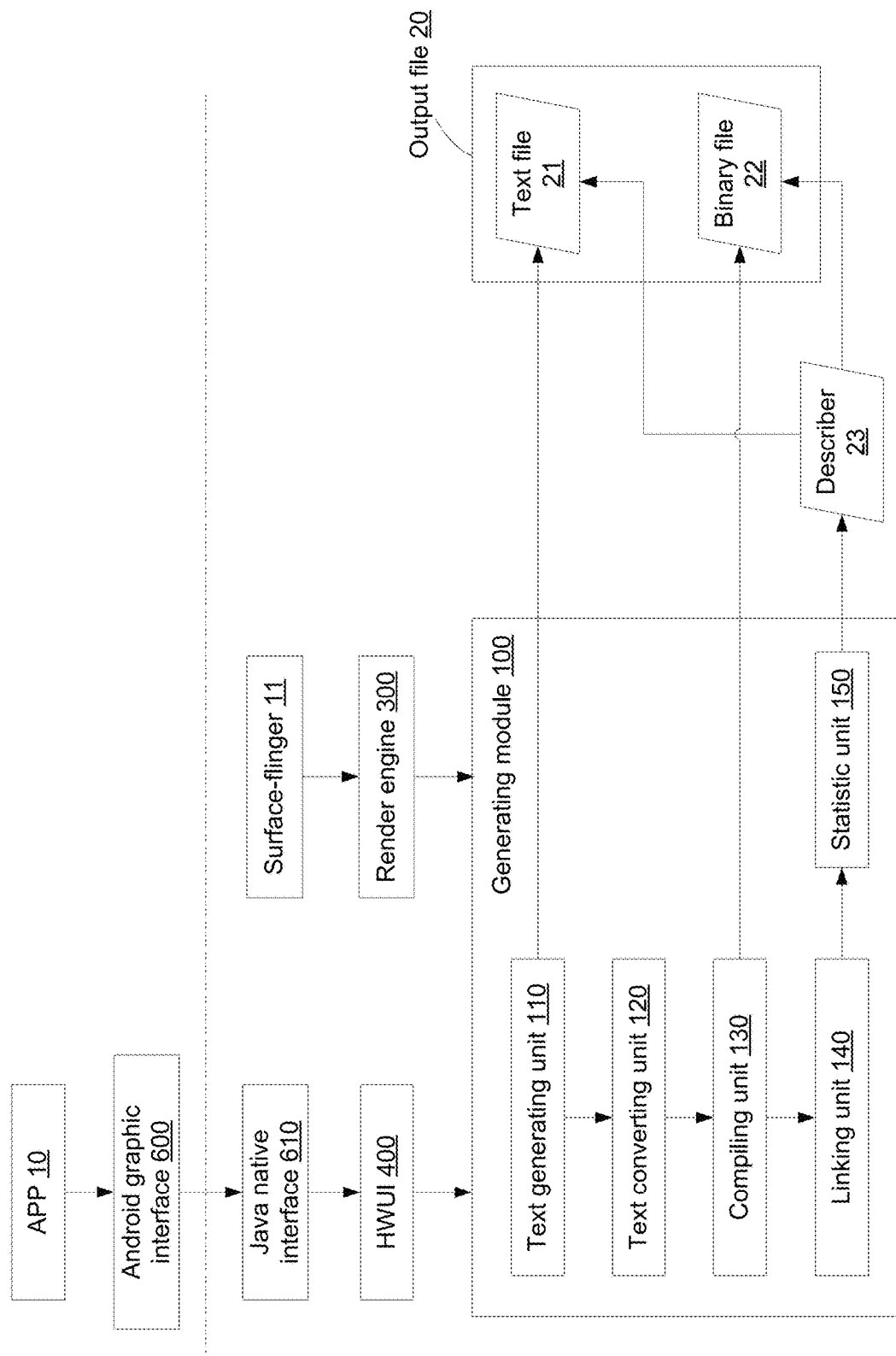
FIG. 2 illustrates a block diagram of the generating module and an operation thereof.

Referring to FIG. 2, which illustrates a block diagram of the generating module 100 and an operation thereof. The APP 10 may serve as a "caller" role and use a package name (or a process name, etc.) to inform the generating module 100 which shader is of interest (i.e., the shader of interest). Furthermore, the APP 10 may utilize the generating module 100 to query interested pages, animation or schemes to be rendered by the interested shader. Such as, the APP 10 may inform the generating module 100 about the shader through a stack of layers of the Android graphic interface 600 (i.e., the graphic interface in the upper layer, such as Canvas, View, etc.), a Java-native-interface (JNI) 610 and the HWUI 400. Alternatively, when the shader will perform graphics rendering base on overlaying images with the GPU, the surface-flinger 11 may inform and utilize the generating module 100 through the render engine 300.

The generating module 100 includes a text generating unit 110, a text converting unit 120, a compiling unit 130, a linking unit 140 and a statistic unit 150. The generating module 100 performs the pre-compilation for the shader under the following conditions: (1) when the APP 10 is activated for the very first time, (2) when a page is firstly used by the APP 10 and causes a change of graphics drawing, and (3) when a content of the APP 10 is updated and causes a change of graphics drawing.

More particularly, the Skia graphics library may provide a "make SKSL program" function, and such a make SKSL program function is modified to form the text generating unit 110 of the generating module 100. The text generating unit 110 is used to generate the text file 21 (e.g., the SKSL text file) for the shader, and the text generating unit 110 may directly output the text file 21 to the installing module 200 of FIG. 1. Furthermore, the text converting unit 120 is used to convert the text file 21 from the SKSL format to a GLSL (OpenGL Shading Language) format.

Moreover, for the GPU which supports loading of binary codes, the compiling unit 130 is used to compile the GLSL text file into the binary file 22, and the compiling unit 130 may directly output the binary file 22 to the installing module 200 of FIG. 1. In addition, the linking unit 140 is used to link the binary file 22, and the statistic unit 150 is used to perform a statistical computation to generate a describer 23. The describer 23 may include a frequency of usage of the shader during the pre-compilation. Alternatively, the describer 23 may further include a GPU hardware information, a driver version, and an Android system version corresponding to the binary file 22. The describer 23 may be written into headers of the text file 21 and the binary file 22, which may facilitate subsequent installing processes of the shader, as will be described in the following paragraphs by reference to FIG. 3.

Figure 3:
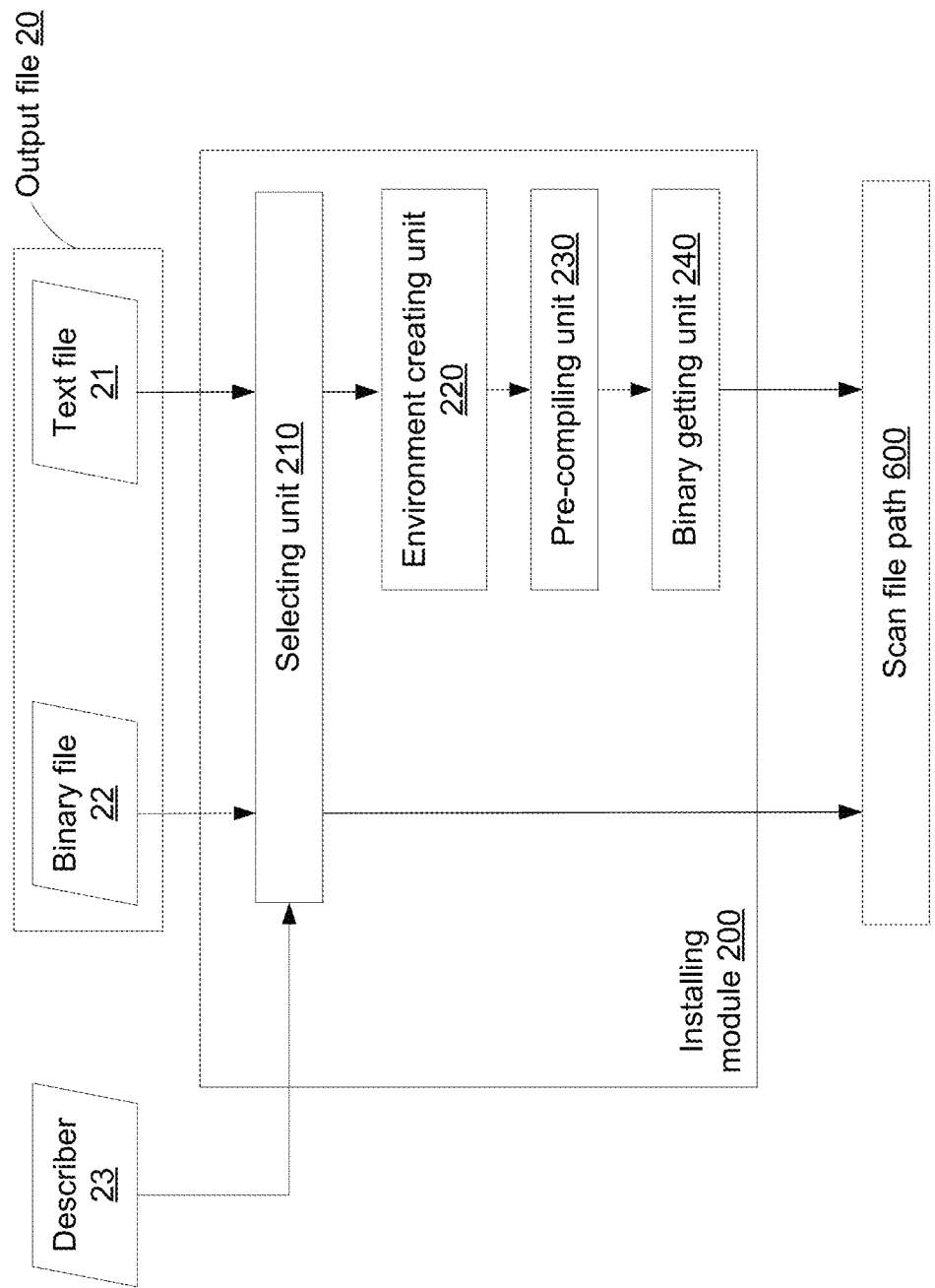
FIG. 3 illustrates a block diagram of the installing module and an operation thereof.

Referring to FIG. 3, which illustrates a block diagram of the installing module 200 and an operation thereof. The installing module 200 performs to install the shader to the operating system of the local device under the following conditions: (1) when the APP 10 is installed to the local device, (2) when the APP 10 is activated for the very first time, and (3) when the surface-flinger 11 is activated.

The installing module 200 includes a selecting unit 210, an environment creating unit 220, a pre-compiling unit 230 and binary getting unit 240. The selecting unit 210 may obtain the describer 23 from the headers of the binary file 22 and/or the text file 21. Based on the describer 23, the selecting unit 210 selects the binary file 22 or the text file 21 for installing the shader. In one example, when the binary file 22 corresponding to the shader exists, the binary file 22 may have a priority to be selected and directly stored into a scan file path 600. The scan file path 600 may be contained in the first persistent cache 310 and/or the second persistent cache 410 of FIG. 1. Such as, when the shader is associated by the APP 10, the binary file 22 may be stored in the scan file path 600 contained in the second persistent cache 410. Alternatively, when the shader is associated by the surface-flinger 11, the binary file 22 may be stored in the scan file path 600 contained in the first persistent cache 310.

On the other hand, if no any binary file exists, or, if related information (e.g., the driver version or the Android system version) of the binary file 22 is mismatched, the binary file 22 may not be selected. Instead, the selecting unit 210 may select the text file 21 for installing the shader. The selecting unit 210 may firstly send the text file 21 to the environment creating unit 220, and the environment creating unit 220 is used to provide rendering contexts for the shader. The rendering contexts are, e.g., environmental schemes for the installing process of the shader, but not for the rendering process.

In one example with an OpenGL (Open Graphics Library), the pre-compiling unit 230 is used to utilize a "Pre-compiled-Program" function provided by the Skia graphics library, which may convert the text file 21 from the SKSL format to the GLSL format, through an interface of the Skia graphics library. Then, the GLSL format will be compiled as the binary file 22 by the binary getting unit 240. The binary getting unit 240 utilizes a "Get-Program-Binary" function provided through the GPU DDK (Driver Development Kits) interface, so as to capture compiled binary codes from the GPU and generate the binary file 22. Then, the binary getting unit 240 stores the compiled binary codes to the scan file path 600.

In another example with a skia-VK (Vulkan implementation) backend, the pre-compiling unit 230 is used to utilize a "shader compile" function provided by the Skia graphics library, which may convert the text file 21 from the SKSL format to a SPIR-V format. Then, the binary getting unit 240 stores the SPIR-V codes to the scan file path 600. More particularly, for the case of the skia-VK backend, the generating module 100 may further include a unit of catch pipeline cache (not shown in FIG. 3). The catch pipeline cache is used to obtain updated information of a pipelineCache, by utilizing a function of "vkGetPipelineCacheData" of the skia-VK backend when each frame associated the APP is processed through the skia-VK interface. Thereafter, the updated information of the pipelineCache may be contained in the binary file 22.

Furthermore, for the case of the skia-VK backend, when the pipelineCache information is contained in the binary file 22, the installing module 200 may store such pipelineCache information into the scan file path 600. In the operation of the APP 10, the above pipelineCache information may be obtained from the scan file path 600, and then be loaded through a function of "vkCreateGraphicsPipelines" of the skia-VK interface.

The selecting unit 210 may partially install the pre-compiled shader based on the usage frequency thereof, so as to reduce the time for installation and save the space of the first persistent cache 310 and the second persistent cache 410. In another example, when the shader is created, the text file 21 and/or the binary file 22 may be integrated into an installation package. The installation package may include information of the text file 21 and the binary file 22 corresponding to respective contents. In still another example, before the APP 10 is installed or used, the binary file 22 may be updated and downloaded from a remote server based on the following information: the GPU hardware information, the driver version, and the version of Android system. In still an alternative example, the surface-flinger 11 may be directly located in a directory corresponding to a system image.

Figure 4:
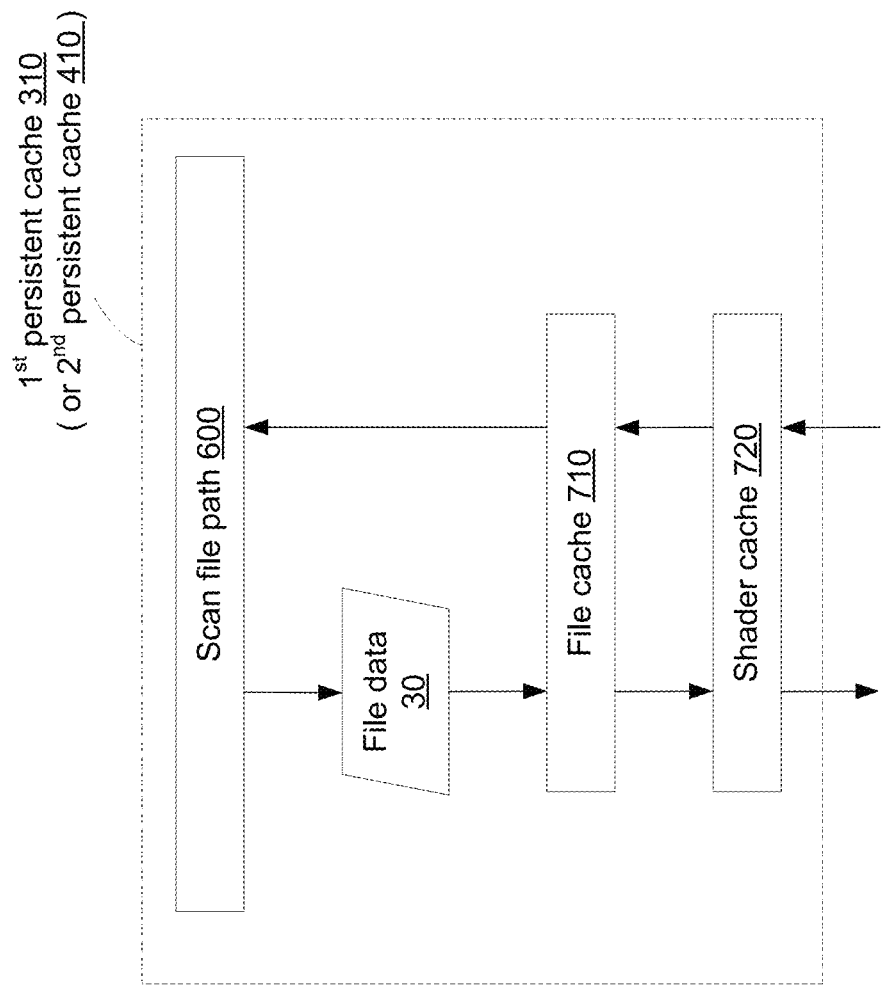
FIG. 4 illustrates an operation of various caches of the pre-processing system.

Referring to FIG. 4, which illustrates an internal architecture of each of the first persistent cache 310 and the second persistent cache 410. Within each of the first persistent cache 310 and the second persistent cache 410, there may be a scan file path 600, a file cache 710 and a shader cache 720. The file cache 710 is e.g., a "fileBlob" cache.

When the APP 10 is activated and/or the surface-flinger 11 is activated in a prime-cache stage, the pre-processing system 1000 may read the file data 30 from the scan file path 600. The file data 30 may include the pre-compiled shader with its text file 21 and binary file 22, and further include updating of other shader(s) in running than the shader. Each of the first persistent cache 310 and the second persistent cache 410 may be a ROM (read only memory) cache. Therefore, the file data 30, which is stored in the scan file path 600, can be retained even when the local device is power-off.

Then, the file data 30 is loaded to the file cache 710 and the shader cache 720. The file cache 710 has a list of cache-entries, and the file data 30 may be recorded in the cache-entries. The Skia graphics library may look up the cache-entries in the file cache 710 to check whether the cache-entries have recorded any item (i.e., any shader) corresponding to a key of the shader of interest. The list of cache-entries records a matching relationship between shader descriptions and shader files, used for a fast lookup in a memory. Looking up the list of cache-entries with shader descriptions for faster obtaining data form the memory of a device. The memory may a RAM, a DRAM of an SOC. etc.

Subsequent querying of the file data 30 may be performed on the file cache 710 and the shader cache 720. Due to the rapid accessing of the RAM caches characteristics of the file cache 710 and the shader cache 720, efficiency of subsequent querying of the file data 30 may be enhanced.

During the runtime of the APP 10 and/or the surface-flinger 11, when any new shader(s) other than the pre-compiled shader exists, such new shader(s) may be updated and stored in the shader cache 720. Then, the new shader(s) may be periodically flushed to the scan file path 600 in the first persistent cache 310 and/or the second persistent cache 410. By means of such a periodical flushing for the shader (s), the I/O interface of the local device (not shown in the figures) may be avoided to be frequently accessed.

Figure 5:
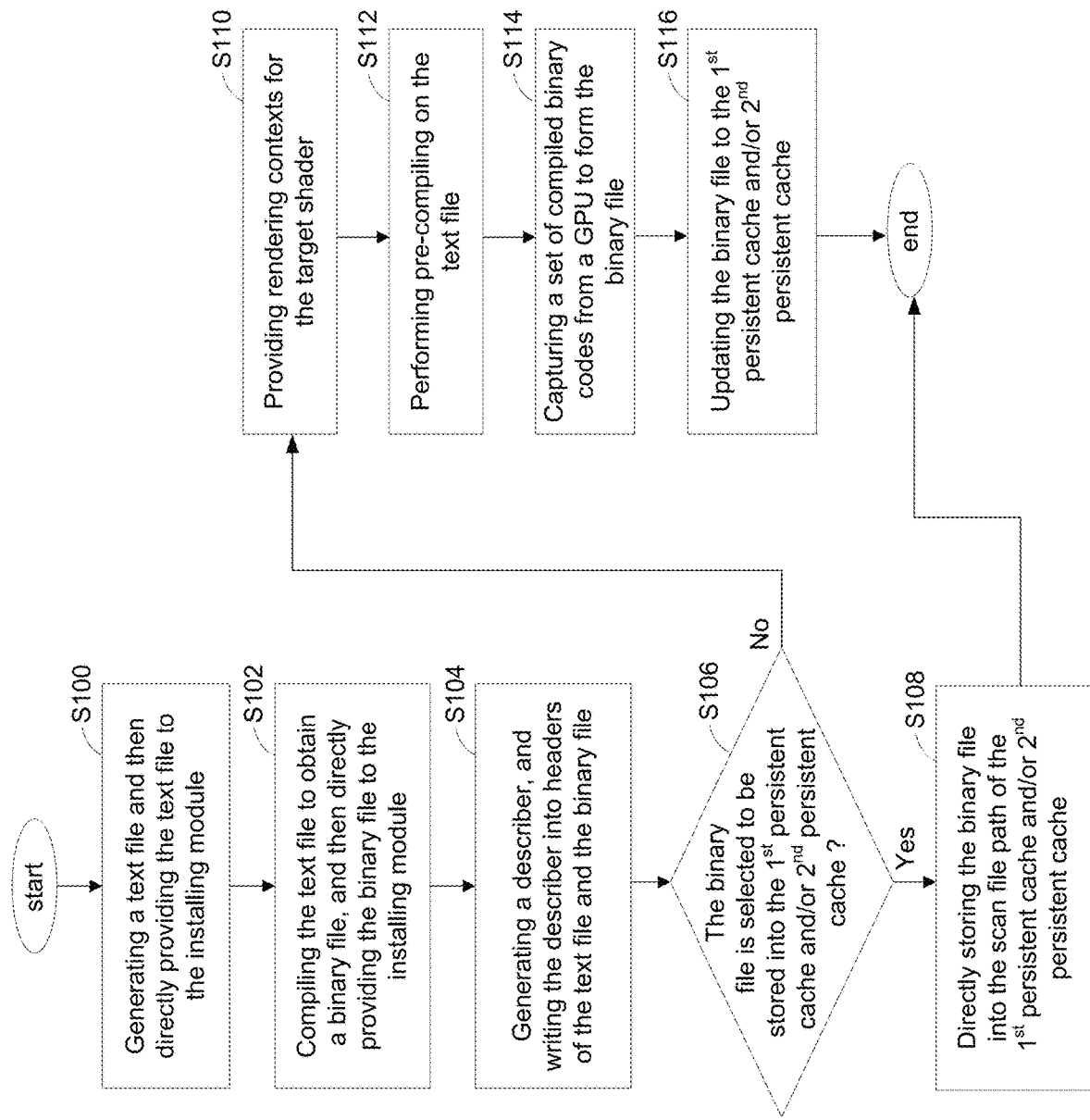
FIG. 5 illustrates a flow diagram of a pre-processing method according to an embodiment of the present disclosure.

Referring to FIG. 5, which illustrates a flow diagram of a pre-processing method according to an embodiment of the present disclosure. The pre-processing method may be carried out with the pre-processing system 1000 of various embodiments shown in FIGS. 1-4, which starts at step S100: generating a text file 21 by the text generating unit 110 of the generating module 100, and then directly providing the text file 21 to the installing module 200. The text file is e.g., a SKSL text file. In one example, step S100 may be executed in the early development stage of the APP 10 or in the pre-compiling stage of the shader (e.g., executed in a "debug mode" or a "capture mode" of the early development stage of the APP 10). More particularly, in one example, step S100 may be executed when the APP 10 is activated for the very first time, when a page is firstly used by the APP 10 and causes a change of graphics drawing, when a content of the APP 10 is updated and causes a change of graphics drawing, when a modification occurs during a "hot-updating" to the APP 10, or when a complex animation is updated in real time.

Then, at step S102, the text file 21 is compiled to obtain the binary file 22 by a compiling unit 130, and then the binary file 22 is directly provided to the installing module 200. The binary file 22 includes a plurality of shader binary codes. Then, at step S104, a describer 23 is generated by the statistic unit 122. And, the describer 23 is written into headers of the text file 21 and the binary file 22. The text file 21, the binary file 22 and the describer 23 are associated with the shader used to render the pages for the APP 10.

Then, at step S106, the selecting unit 210 determines whether to select the binary file 22 or the text file 21 to be stored into the scan file path 600 of the first persistent cache 310 and/or the second persistent cache 410 based on the describer 23. In one example, step S106 may be triggered when the APP 10 is installed to the local device, when the APP 10 is activated for the first time, or when the surface-flinger 11 is activated. In step S106 if the binary file 22 is selected to be stored, executing step S108: directly storing the binary file 22 into the scan file path 600.

On the other hand, in step S106 if the text file 21 is selected to be stored, executing step S110: providing rendering contexts for the shader. The rendering contexts are environmental schemes for the installation of the shader, but not for the rendering. Then, at step S112, pre-compilation is performed on the text file 21. Such as, for the case of OpenGL, the pre-compiling unit 230 is used to utilize a "Pre-compiled-Program" function (provided by the Skia graphics library) to convert the text file 21 from the SKSL format to the GLSL format. Then, at step S114, the binary getting unit 240 utilizes a "Get-Program-Binary" function (provided through the GPU DDK interface) to capture compiled binary codes from the GPU and generate the binary file 22.

Alternatively, for the case of skia-VK (Vulkan implementation) backend, at step S112 the pre-compiling unit 230 utilizes a "shader compile" function (provided by the Skia graphics library) to convert the text file 21 from the SKSL format to a SPIR-V format. Then, step S116 is executed.

At step S116, the Skia graphics library updates and flushes the file data 30 (e.g., the binary file 22) to the scan file path 600 in the first persistent cache 310 and/or the second persistent cache 410.

In some comparative examples (not shown in FIGS. 1-6), a separate persistent cache for each APP may be utilized to record shaders which have been used. However, in case a new shader is generated by a new graphics drawing command, such a new shader is not recorded in the persistent cache. Therefore, compiling process for such a new shader cannot be avoided, and the compiling time will block the rendering time.

In contrast to the above comparative examples, in the present disclosure the pre-compiling process for the shaders is moved forward. The pre-compiling process may be performed in advance during the "debug mode" or the "capture mode" of the early development stage of the APP 10 (e.g., the pre-compiling process may be performed when the APP 10 is activated for the very first time). Therefore, the compilation for the shaders will not block the rendering process, even if a new shader (which is not recorded in any cache) is encountered.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A pre-processing system for pre-compiling a shader, comprising:
    a first persistent cache, disposed in a render engine of surface-flinger;
    a second persistent cache, disposed in a HWUI (Hardware Accelerated Rendering Engine for User Interface);
    a generating module, for generating an output file which comprises a text file, a binary file and a describer associated with the shader, wherein the shader is used to render a plurality of pages for an APP (application program); and
    an installing module, for storing the text file and the binary file into a scan file path of the first persistent cache and/or the second persistent cache based on the describer.

2. The pre-processing system according to claim 1, wherein the text file is a SKSL (Skia's shading language) text file, and the binary file includes a plurality of shader binary codes.

3. The pre-processing system according to claim 1, wherein the generating module comprising:
    a text generating unit, for generating the text file, and providing the text file to the installing module; and
    a compiling unit, for compiling the text file to obtain the binary file, and providing the binary file to the installing module.

4. The pre-processing system according to claim 1, wherein the generating module comprising:
    a statistic unit, for generating the describer which is written into a header of each of the text file and the binary file.

5. The pre-processing system according to claim 4, wherein the describer at least includes a frequency of usage of the shader, and a hardware information of a GPU (graphics processing unit), a driver version, and a version of an Android system corresponding to the binary file.

6. The pre-processing system according to claim 1, wherein the installing module comprising:
    a selecting unit, for selecting the binary file or the text file to be stored into the scan file path of the first persistent cache and/or the second persistent cache based on the describer.

7. The pre-processing system according to claim 6, wherein the installing module further comprising:
    an environment creating unit, for providing rendering contexts for the shader when the text file is selected to be stored into the scan file path;
    a pre-compiling unit, for performing pre-compiling on the text file; and
    a binary getting unit, for capturing a set of compiled binary codes from a GPU to form the binary file.

8. The pre-processing system according to claim 1, further comprising:
    a file cache, for recording a list of cache-entries, wherein the text file and the binary file are read from the scan file path and stored into the file cache;
    wherein the list of cache-entries records a matching relationship between a plurality of shader descriptions and a plurality of shader files, used for a fast lookup in a memory.

9. The pre-processing system according to claim 1, wherein the generating module operates in a debug mode or a capture mode of an early development stage of the APP, when the APP is activated for the first time or when a page is firstly used by the APP and causes a change of graphics drawing.

10. The pre-processing system according to claim 1, wherein the installing module operates when the APP is installed to a local device or when the APP is activated for the first time.

11. A pre-processing method for pre-compiling a shader, comprising:
  generating an output file which comprises a text file, a binary file and a describer associated with the shader, wherein the shader is used to render a plurality of pages for an APP (application program); and
  storing the text file and the binary file into a scan file path of a first persistent cache and/or a second persistent cache based on the describer;
  wherein the first persistent cache is disposed in a render engine of surface-flinger, and the second persistent cache is disposed in a HWUI (Hardware Accelerated Rendering Engine for User Interface).

12. The pre-processing method according to claim 11, wherein the text file is a SKSL (Skia's shading language) text file, and the binary file includes a plurality of shader binary codes.

13. The pre-processing method according to claim 11, wherein the step of generating the text file and the binary file comprising:
  generating the text file by a text generating unit and providing the text file; and
  compiling the text file to obtain the binary file by a compiling unit and providing the binary file.

14. The pre-processing method according to claim 11, wherein the step of generating the describer comprising:
  generating the describer by a statistic unit;
  wherein the describer is written into a header of each of the text file and the binary file.

15. The pre-processing method according to claim 14, wherein the describer at least includes a frequency of usage of the shader, a hardware information of a GPU (graphics processing unit), a driver version, and an Android version corresponding to the binary file.

16. The pre-processing method according to claim 11, wherein the step of storing the text file and the binary file into the scan file path comprising:
  selecting the binary file or the text file to be stored into the scan file path of the first persistent cache and/or the second persistent cache based on the describer.

17. The pre-processing method according to claim 16, wherein when the text file is selected to be stored into the scan file path, and the pre-processing method further comprising:
  providing rendering contexts for the shader;
  performing pre-compiling on the text file; and
  capturing a set of compiled binary codes from a GPU to form the binary file.

18. The pre-processing method according to claim 11, further comprising:
  reading the text file and the binary file from the scan file path;
  storing the text file and the binary file into a file cache, wherein the file cache is used to record a list of cache-entries; and
  looking up the list of cache-entries with a matching relationship between a plurality of shader descriptions and a plurality of shader files.

19. The pre-processing method according to claim 11, wherein the step of generating the text file, the binary file and the describer is performed in a debug mode or a capture mode of an early development stage of the APP, when the APP is activated for the first time, or when a page is firstly used by the APP and causes a change of drawing.

20. The pre-processing method according to claim 11, wherein the step of storing the text file and the binary file into a scan file path is performed when the APP is installed to a local device, or when the APP is activated for the first time.

* * * * *